(12) United States Patent
Forster

(10) Patent No.: US 8,947,236 B2
(45) Date of Patent: Feb. 3, 2015

(54) SENSING PROPERTIES OF A MATERIAL LOADING A UHF RFID TAG BY ANALYSIS OF THE COMPLEX REFLECTION BACKSCATTER AT DIFFERENT FREQUENCIES AND POWER LEVELS

(75) Inventor: Ian J. Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 463 days.

(21) Appl. No.: 13/008,054

(22) Filed: Jan. 18, 2011

(65) Prior Publication Data

US 2012/0182147 A1    Jul. 19, 2012

(51) Int. Cl.
| | | |
|---|---|---|
| G08B 13/14 | (2006.01) |
| G08B 1/08 | (2006.01) |
| H04Q 5/22 | (2006.01) |
| H01Q 1/50 | (2006.01) |
| H01Q 1/36 | (2006.01) |
| G06K 19/077 | (2006.01) |

(52) U.S. Cl.
CPC ..................... *G06K 19/077* (2013.01)
USPC .................. 340/572.7; 340/539.22; 340/10.4; 340/10.41; 343/860; 343/700 MS; 343/895

(58) Field of Classification Search
CPC  H04Q 5/22; G06K 19/07749; G06K 19/0701
USPC ...................... 340/572.7, 539.22, 10.4, 10.41; 343/860, 700 MS, 895
See application file for complete search history.

(56) References Cited

U.S. PATENT DOCUMENTS

| | | | | |
|---|---|---|---|---|
| 5,485,040 | A | * | 1/1996 | Sutterlin ........................... 307/3 |
| 6,950,068 | B2 | * | 9/2005 | Bordi et al. .................... 343/702 |
| 7,170,415 | B2 | | 1/2007 | Forster |
| 7,215,295 | B2 | | 5/2007 | Egbert |
| 7,233,250 | B2 | | 6/2007 | Forster |
| 7,298,273 | B2 | * | 11/2007 | Baba .......................... 340/572.7 |
| 7,477,151 | B2 | | 1/2009 | Forster et al. |
| 7,515,046 | B2 | | 4/2009 | Funo et al. |
| 7,786,868 | B2 | * | 8/2010 | Forster ....................... 340/572.1 |
| 7,798,403 | B2 | | 9/2010 | Tiller et al. |
| 8,159,347 | B2 | * | 4/2012 | Potyrailo et al. ........... 340/572.1 |
| 8,318,099 | B2 | * | 11/2012 | Potyrailo et al. ........... 422/82.02 |
| 2002/0005392 | A1 | * | 1/2002 | Luo et al. ........................ 216/67 |
| 2006/0125605 | A1 | * | 6/2006 | Fischer et al. .............. 340/10.41 |
| 2007/0046433 | A1 | * | 3/2007 | Mukherjee .................... 340/10.1 |
| 2007/0090927 | A1 | * | 4/2007 | Potyrailo et al. ........... 340/10.41 |
| 2007/0176773 | A1 | | 8/2007 | Smolander et al. |
| 2008/0018432 | A1 | * | 1/2008 | Volpi et al. ................... 340/10.3 |
| 2009/0068957 | A1 | * | 3/2009 | Koo et al. .................. 455/67.14 |

(Continued)

OTHER PUBLICATIONS

International Search Report dated May 22, 2012 for International Application No. PCT/US2012/020905 filed Jan. 11, 2012.

(Continued)

*Primary Examiner* — Fekadeselassie Girma
(74) *Attorney, Agent, or Firm* — Avery Dennison Retail Information Services LLC

(57) ABSTRACT

An RFID device for sensing the properties of a material in proximity to a UHF tag. The RFID device includes a microchip, an antenna operatively coupled to the microchip, and an impedance transforming section operatively coupled to the microchip and to the antenna. Changing an electrical characteristic of at least one component of the RFID device results in a complex reflected signal at a reader device representing a sensed state of a material in proximity to the RFID device.

28 Claims, 14 Drawing Sheets

(56) References Cited

U.S. PATENT DOCUMENTS

| | | |
|---|---|---|
| 2009/0184824 A1 | 7/2009 | Forster |
| 2009/0206995 A1 | 8/2009 | Forster |
| 2009/0278685 A1* | 11/2009 | Potyrailo et al. ........... 340/572.1 |
| 2009/0309707 A1 | 12/2009 | Kamprath |
| 2011/0202299 A1* | 8/2011 | Youn .............................. 702/85 |
| 2012/0206313 A1* | 8/2012 | Jaakkola ....................... 343/793 |

OTHER PUBLICATIONS

Written Opinion dated May 22, 2012 for International Application No. PCT/US2012/020905 filed Jan. 11, 2012.

Gaetano et al.; Multiport Sensor RFIDs for Wireless Passive Sensing of Objects; IEEE Transactions on Antennas and Propagation, vol. 56, No. 8, Aug. 2008.

* cited by examiner

SENSING PROPERTIES OF A MATERIAL LOADING A UHF RFID TAG BY ANALYSIS OF THE COMPLEX REFLECTION BACKSCATTER AT DIFFERENT FREQUENCIES AND POWER LEVELS

TECHNICAL FIELD OF THE INVENTION

Embodiments of the invention relate generally to radio frequency identification (RFID) tags and, in particular, to communications between the Ultra High Frequency (UHF) RFID tags and reader to assess the state of a material in proximity to the tag antenna.

BACKGROUND OF THE INVENTION

Automatic identification is the broad term applying to a host of technologies that are used to help machines identify objects. Automatic identification is often coupled with automatic data capture. Therefore, companies wanting to identify items are able to capture information about the items, to store the captured information in a computer, and to retrieve selectively the information from the computer for a variety of useful purposes, all with minimal human labor.

One type of automatic identification technology is radio-frequency identification (RFID). Radio-frequency identification is a generic term for technologies that use radio waves to automatically identify objects. There are several conventional methods of identifying objects using RFID, the most common of which is to store a serial number (and other information, if desired) that identifies a product on a microchip that is attached to an antenna. The chip and the antenna together define an RFID transponder circuit. The antenna enables a remote reader that has a transceiver to communicate with the chip, and enables the chip to transmit identification information back to the reader when actuated to do so by the reader. The reader converts the radio waves returned from the RFID tag into a form that can then be utilized by a computer.

RFID tags are classified into three different types: active, semi-active, and passive. Active and semi-active tags include a battery to power the microchip. While passive tags are remotely-powered, active tags broadcast their information. Passive tags are the most frequently used since they have a low cost of production and are easily used. Low frequency RFID systems (125-148 kHz) and high frequency RFID systems (13.56 MHz) have short transmission ranges up to 1 meter. Ultra-high frequency (UHF) RFID systems (902-928 MHz) can cover a range up to 10 meters. Microwave frequency RFID systems (2.45 GHz) cover transmission ranges up to 30 meters.

Traditionally, RFID tags have been used for wireless tracking of goods and key lock systems for many years. More recently, new applications of RFID technology have been investigated, including the use of RFID tags as sensors in gas phase and liquid phase environments. When detecting a signal, the sensor produces a measureable output, typically a voltage or current that is related to the signal. Sensor applications range from humidity sensing to temperature sensing to food monitoring.

SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The disclosed embodiments resolve how a known antenna characteristic has been modified by a material, such as a gas, liquid or biological agent, or by a physical parameter such as heat, pressure, force or radiation. To do this in the presence of noise and resolve ambiguity and the effects of interfering factors, aspects of the tag are manipulated and the results are measured. In particular, the chip impedance can be set to a known state by bringing the chip impedance to its operating threshold, but then changing the chip impedance in a controlled way by applying power above threshold, giving different "views" of the antenna impedance, which are translated into mixed phase and amplitude modulation backscatter to the tag reader system. By carrying this out at a spread of frequencies, accurate detection of parameters and good rejection of interference can be achieved.

In an embodiment of the invention, an RFID device is provided for sensing the properties of a material in proximity to a UHF tag. The RFID device includes a microchip, an antenna operatively coupled to the microchip, and an impedance transforming section operatively coupled to the microchip and to the antenna. Changing an electrical characteristic of at least one component of the RFID device results in a complex reflected signal at a reader device representing a sensed state of a material in proximity to the RFID device.

In an embodiment of the invention, an RFID device is provided for sensing the properties of a material in proximity to a UHF tag. The RFID device includes a microchip and a combined structure operatively coupled to the microchip, including an antenna section and a conductor loop wherein the conductor loop functions as an impedance transforming section. An environmentally sensitive material added to the structure causes a change in an electrical characteristic of the combined structure in response to a signal from an RFID reader resulting in a complex reflected signal received at the reader representing a sensed state of the material.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These and other advantages and aspects of the embodiments of the invention will become apparent and more readily appreciated from the following detailed description of the embodiments taken in conjunction with the accompanying drawings, as follows.

DETAILED DESCRIPTION

Figure 1:
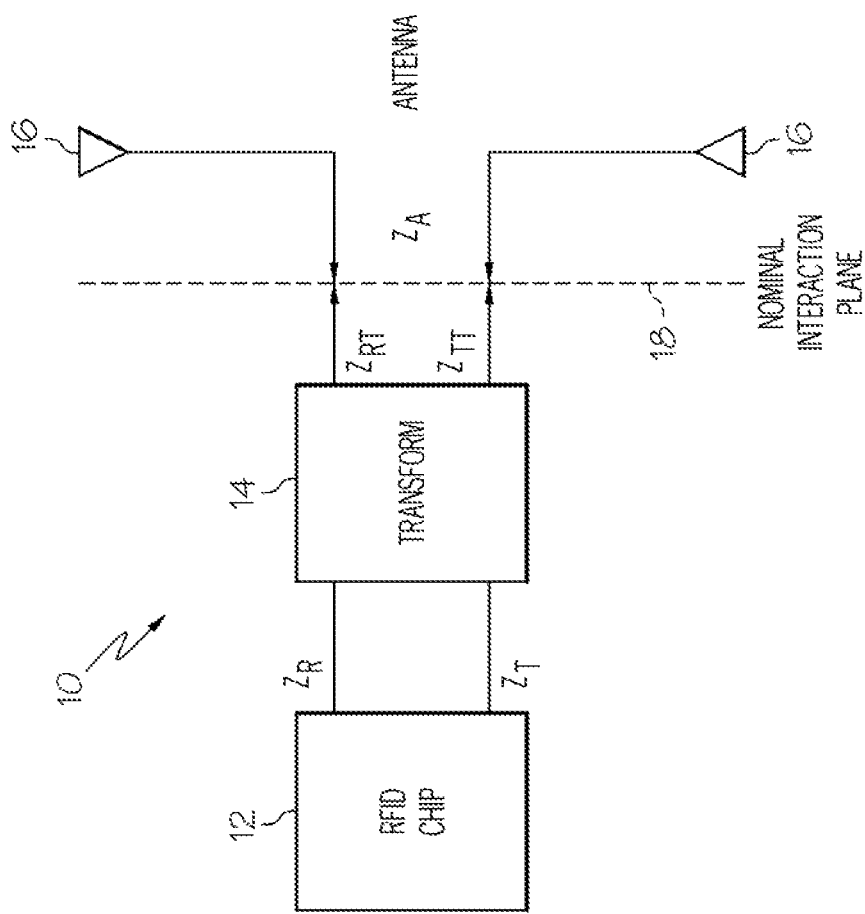
FIG. 1 illustrates a configuration block diagram of an RFID tag in accordance with an exemplary embodiment.

The following description is provided as an enabling teaching of embodiments of the invention including the best, currently known embodiment. Those skilled in the relevant art will recognize that many changes can be made to the embodiments described, while still obtaining the beneficial results of the disclosed embodiments. It will also be apparent that some of the desired benefits of the embodiments described can be obtained by selecting some of the features of the disclosed embodiments without utilizing other features. Accordingly, those who work in the art will recognize that many modifications and adaptations to the embodiments described are possible and may even be desirable in certain circumstances. Thus, the following description is provided as illustrative of the principles of the invention and not in limitation thereof, since the scope of the invention is defined by the claims.

Loading resonators, such as LC circuits, Quartz crystals and surface acoustic wave (SAW) devices, with materials that change either electrical or mechanical characteristics in response to a sensed material or state, thereby changing the properties of the resonators, is a known technology. Applied to transducers, this technology relies on the relatively high Q value of these devices to make analysis of the results simple. The Q factor or value is a measure of the voltage and current step-up in a resonant circuit at its resonant frequency.

Unlike devices operating at lower frequencies, UHF RFID devices do not normally operate as a simple resonator. If they did, using a simple parallel model at 915 MHz, with $C_p=1$ pF and $R_p=1000$ ohms, the Q value would be 5.75, which would make accurate sensing difficult.

Embodiments disclosed herein use the characteristics of the communication between a UHF RFID tag and reader to assess the state of a material in proximity to the antenna. One communications protocol for UHF RFID tags is the EPCglobal Class 1 Generation 2 protocol standard. EPCglobal protocols assume the tag carries a unique identifier called the electronic product code (EPC).

With an UHF RFID tag, the design is a more complex relationship between the following parameters:

RFID chip complex input impedance in the receive state: $R_R - jX_R$

RFID chip complex input impedance in the reflect/modulator on state: $R_T - jX_T$ Antenna impedance: $R_A + jX_A$ In a UHF tag design, the design engineer is usually attempting to get the maximum power transfer between the antenna and the chip over a defined frequency band. The optimum state is called a conjugate match, where $R_A$ and $R_R$ are equal and $jX_A$ and $jX_T$ are equal and of opposite sign.

For an UHF device adapted to act as a sensor, the antenna impedance is now a function, to some extent, of the state analyzed, such as the presence of a gas, liquid or biological material. The disclosed embodiments relate to how the change in impedance of the antenna characteristic of the sensed event can be measured remotely by an RFID reader, and distinguished from the effects of the environment around the RFID inlay. An RFID inlay includes an antenna and a microchip and is usually supplied on a substrate or a carrier. The inlay is supplied to a converter where it is inserted into a label or tag.

The state required for sensing is distinct from the state required for normal RFID operation. It arranges the transformed chip impedance and antenna impedance that is to some extent a function of an analyte concentration, in a way that affects the modulation process generating a backscattered signal. By setting the chip impedance to a known state at threshold and varying that impedance and frequency, a measurement of the characteristics of the material loading the antenna may be taken by a remote reader system. The state is determined by looking at how the backscattered signal from the tag to the reader is modified, particularly how the phase modulation and amplitude modulation components interact.

Communication between an RFID inlay and a reader typically involves a data downlink, such as command messages, in the form of amplitude modulation of the RF signal, and the tag sending data back by changing its impedance from its receive state to its transmit state, reflecting a modulated signal.

The modulated signal is a mixture of two forms of modulation—amplitude modulation and phase modulation. The magnitude and characteristics of these components are determined by the complex reflection coefficient between the antenna, the chip in a receive state, and the chip in a transmit state, and can be analyzed by the reader. As stated above, the chip impedances are also a function of power and frequency; therefore, for a given antenna impedance against frequency, by altering the read frequency and the power at the tag, and measuring the complex reflected signal back at the reader, the antenna impedance can be evaluated and a sensed value or state can be derived.

The basic configuration of the RFID tag is shown in FIG. 1. At a specific incident RF power, the RFID chip 12 has two impedance states: a receive state $Z_R$ and a transmit state $Z_T$. As for UHF RFID chips, the real part of the input impedance tends to be high, on the order of 1000 ohms, and common antenna impedances, such as a dipole are relatively low, on the order of 70 ohms. It is known to include between these elements an impedance transforming section 14, although it would be appreciated by those skilled in the art that the definition of one section as transformer 14 and another section as antenna 16 is arbitrary in some designs, as they are part of a common structure and the transformation and antenna functions can be considered to be distributed over the structure. To enable a clear description of the embodiments, a nominal interaction plane 18 is defined, wherein the antenna 16 and transformed chip impedance interact to control how the complete RFID tag 10 responds.

The transformed two state complex impedance of the RFID chip 12 and antenna 16 interact at the nominal plane 18. When the transformed RFID chip receive impedance $Z_{RT}$ and antenna impedance $Z_A$ are the complex conjugate of one another, there is no reflected energy; that is, all the power received by the antenna 16 minus the losses caused by resistance and other factors, is transferred to the RFID chip 12 via the transformer 14, which may also have losses. This will give the optimum range for a given RFID tag 10 operating at a single frequency with no disturbing environment. However, in reality, to allow greater bandwidth and tolerance for environmental factors, $Z_A$ is not usually set as exactly the complex conjugate to $Z_{RT}$, so there is an amount of reflection. When the RFID chip 12 changes its impedance to $Z_T$ and $Z_{TT}$ is presented to the antenna $Z_A$, a larger degree of reflection is normal. When $Z_{RT}$ is at, or close to the complex conjugate of $Z_A$, and $Z_{TT}$ is a relatively high mismatch, the backscattered signal can be considered as primarily an amplitude modulation.

Figure 2:
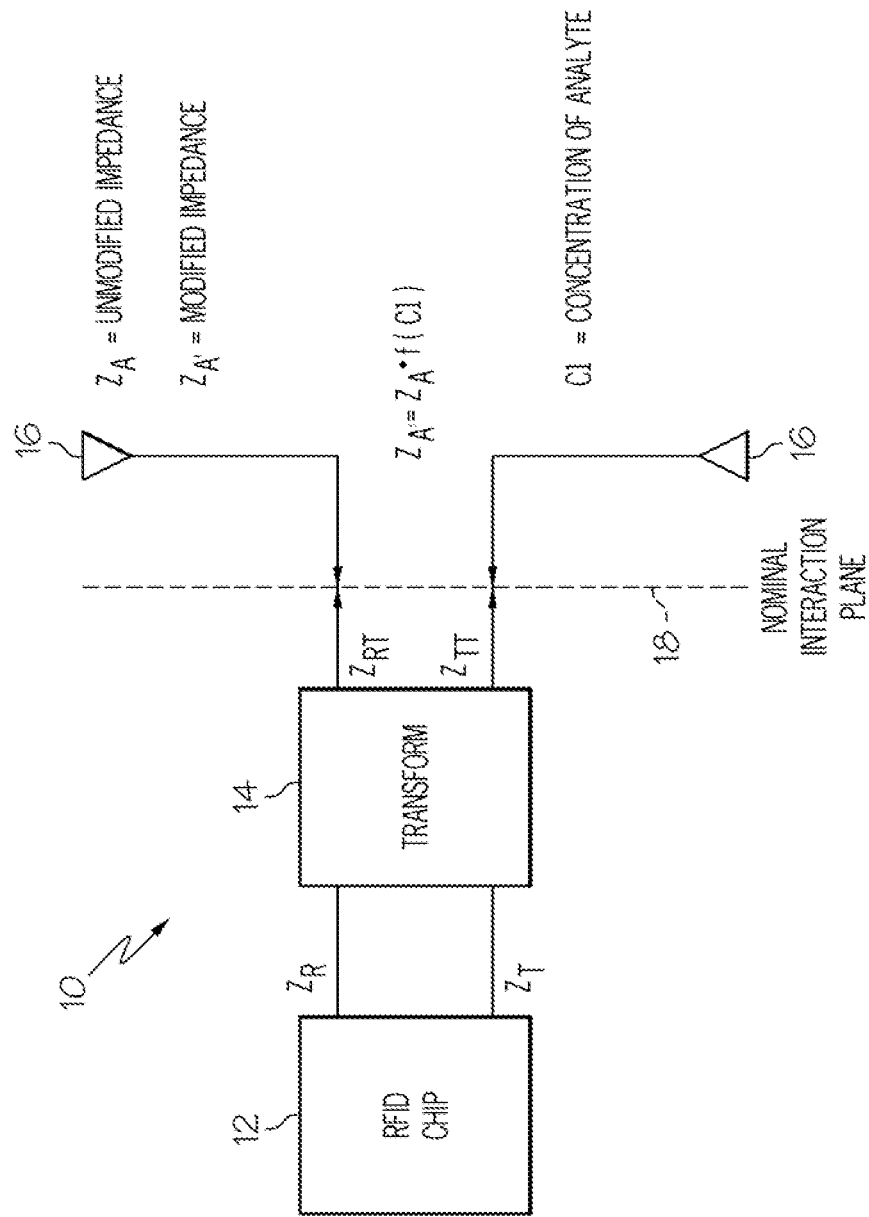
FIG. 2 illustrates modification of RFID antenna impedance by an analyte or interfering material concentration in accordance with an exemplary embodiment.

FIG. 2 illustrates, in block diagram form, how the antenna impedance may be modified and interacts with the transformed chip impedance. Due to proximity to a material (e.g., an analyte) with a complex dielectric constant that changes in response to one or more environmental factors, antenna impedance $Z_A$ alters, and therefore its interaction with $Z_{RT}$ and $Z_{TT}$ is also changed. In particular, by design, $Z_A$ is no longer the complex conjugate of $Z_{RT}$ or $Z_T$, therefore, there is a reflection in both states. This reflection is complex, that is, it has an amplitude, frequently expressed as a reflection coefficient, where a coefficient of one means 100% reflection and a coefficient of zero means no reflection, therefore a perfect match, but also an associated phase angle. The backscattered signal when the chip alters between $Z_{RT}$ and $Z_{TT}$ can now be considered to be a combination of amplitude and phase modulation, dependent on antenna impedance $Z_A$ which is now a function of its environment. In this way the characteristics of the change in antenna impedance may be remotely determined.

Figure 3:
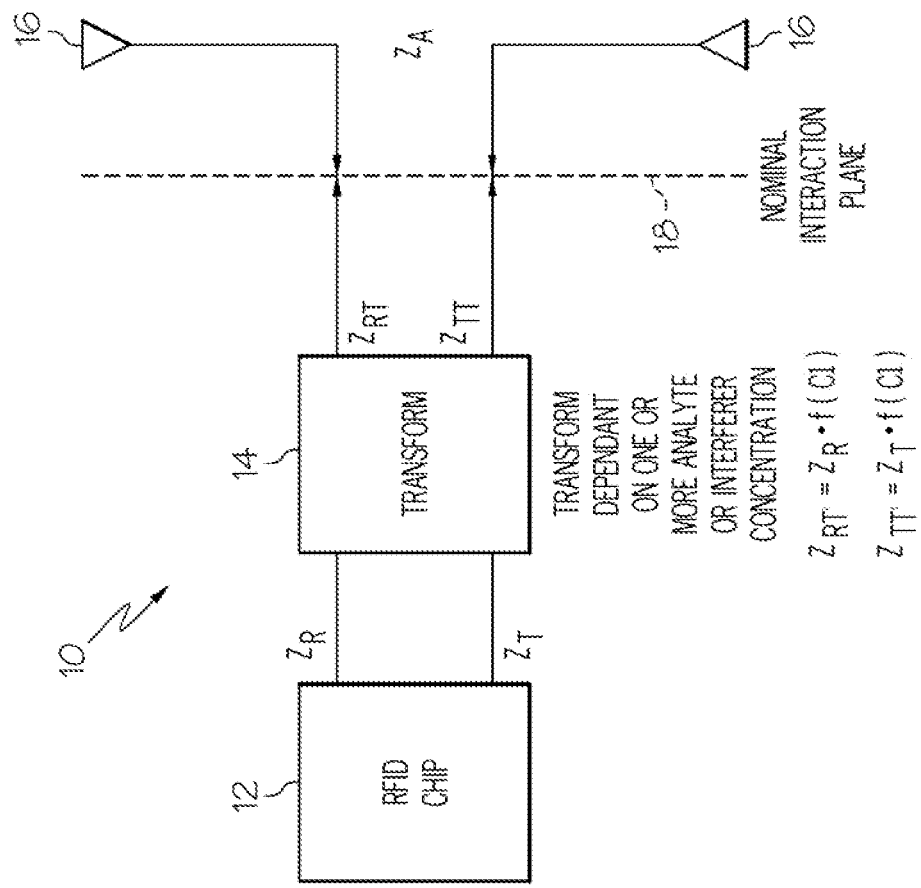
FIG. 3 illustrates an exemplary embodiment in which the transform section is a function of the presence of materials.

In FIG. 3 an alternate configuration is shown where the transforming section 14 itself is made environmentally sensitive, i.e., dependent on an analyte or interferer concentration, and therefore the interaction of $Z_A$ and $Z_{RT'}$ and $Z_{TT'}$ again gives a complex backscattered signal dependent on environmental factors.

Figure 4:
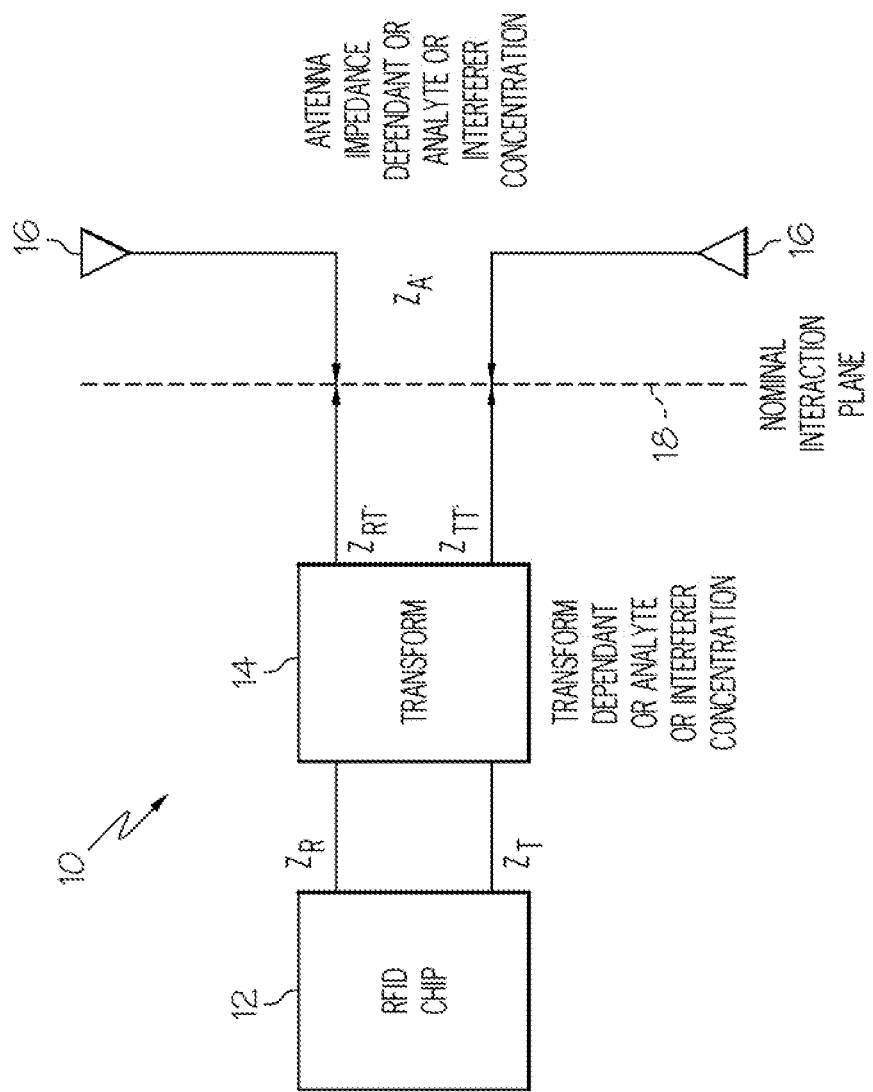
FIG. 4 illustrates an exemplary embodiment in which the antenna and transform section are both dependent upon an analyte or interferer concentration.

In FIG. 4 an alternate configuration is shown where both the transforming section 14 and the antenna 16 are made environmentally sensitive, i.e., dependent on an analyte or interferer concentration. In one arrangement, the sensitivity of the two sections to unwanted environmental influence is opposite on the complex backscattered signal and the response to wanted environmental influence is the same or similar on the complex backscattered signal.

Figure 5:
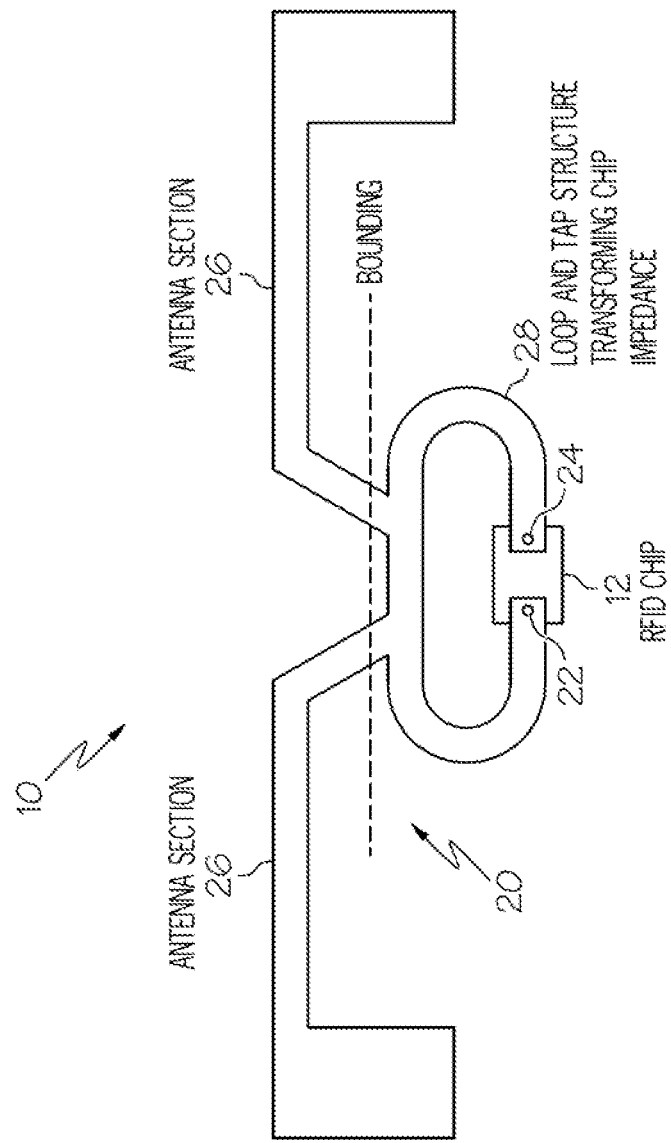
FIG. 5 illustrates an exemplary embodiment of the basic structure of an RFID tag incorporating the elements of FIG. 1.

FIG. 5 shows the basic structure of an RFID tag 10 which can be used for sensing an environmental factor. It includes an RFID chip 12 connected to a structure 20 made of suitable conductor such as copper, aluminum, or silver.

The structure 20 includes two main regions: a loop of conductor 28 with two connection points 22, 24, acting as the impedance transformer, and a linear section 26 acting as a modified form of dipole antenna. Although a loop 28 with two connections is shown, a number of other configurations will work, such as a single connection or no connection, where the coupling between the antenna portion and transformer portion is by electric and magnetic field.

In the design shown, the length of loop 28, dimensions of the conductor and the position of the two tap points 22, 24 relative to each other around the loop perimeter define a tuning and impedance transformation for the tag design. For the antenna 26, the length, shape and presence of features such as large blocks or sharp points at the ends define the antenna performance.

The design of the antenna and transformation network is arranged to give a specific relative complex reflection coefficient in the receive state and transmit state which creates a combination of phase and amplitude modulation. This impedance matching state is distinct from that normally used for an RFID tag design, where the intention is to achieve as close as possible to a conjugate match over a defined band of interest.

Figure 6:
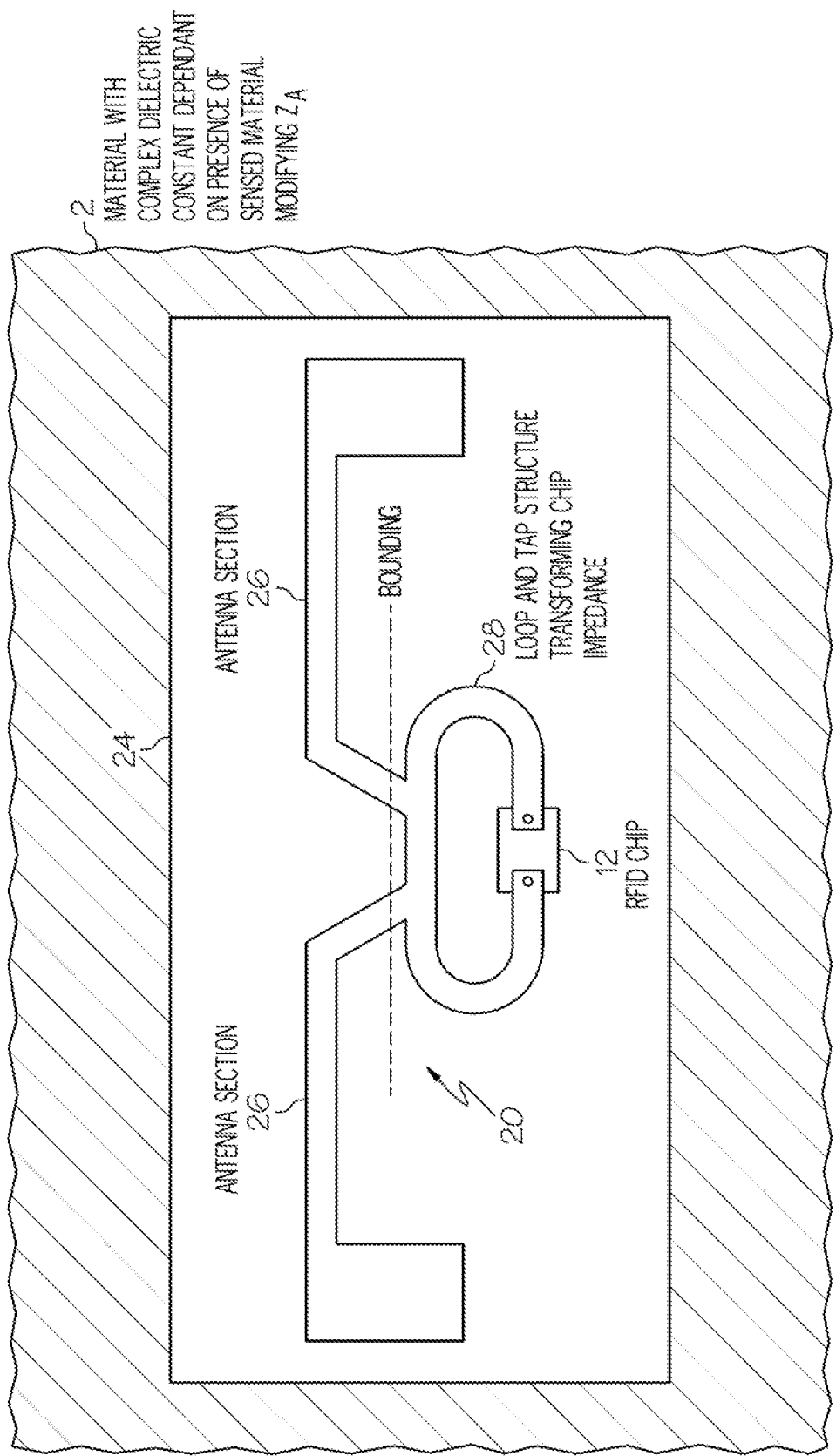
FIG. 6 illustrates sensing with the RFID tag placed on material in accordance with an exemplary embodiment.

In FIG. 6, the RFID tag is shown in proximity to a material 2 with a complex dielectric constant that is, to some extent, a function of environmental factors. The impedance states for the antenna 26 and chip 12 relative to each other are chosen so that a change in the complex dielectric constant creates a defined change in the complex backscatter from the RFID device which can be interpreted by a coherent reader device.

Figure 7:
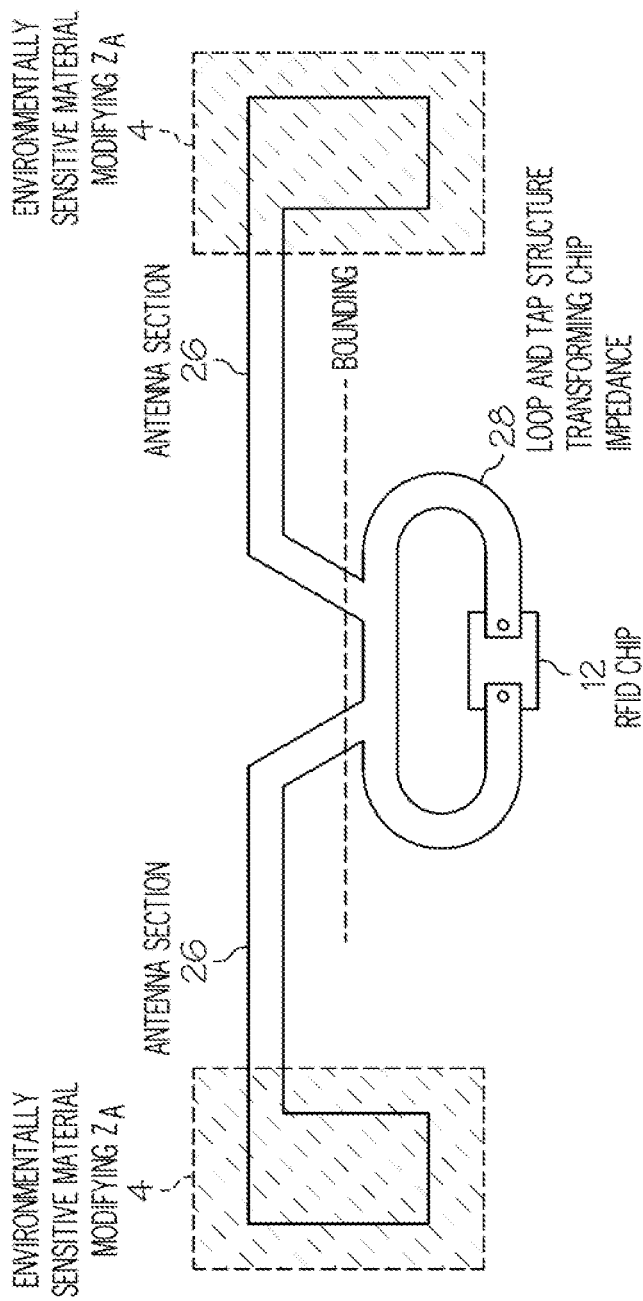
FIG. 7 illustrates sensing using material applied to specific areas of the antenna in accordance with an exemplary embodiment.

FIG. 7 illustrates an arrangement where a specific environmentally sensitive material 4 is placed over areas of the antenna 26 or the impedance transformer. The choice of material 4 and location depends on the environmental factor being sensed, for example, if the material 4 changes its complex dielectric constant, it may be placed on parts of the antenna 26 that have high RF electric fields, such as the ends of the dipole structure or directly across the same gap that the RFID chip 12 is placed. If the material 4 was to change magnetic permeability, placing it close to the central loop 28 may be more effective.

Figure 8:
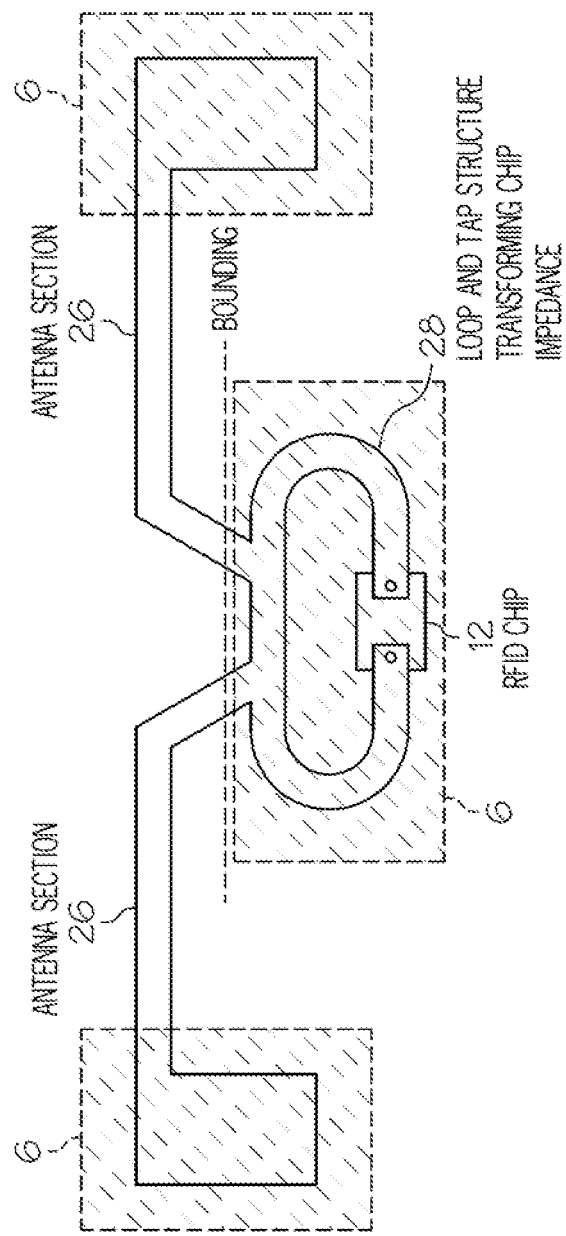
FIG. 8 illustrates sensing material applied over both the antenna and transformer section in accordance with an exemplary embodiment.

FIG. 8 illustrates a structure where both the impedance transformer and antenna 26 are covered by a common material 6. In one embodiment, the effect of the wanted environmental factor on both sections will create an additive effect on the backscattered signal, and the effect on an unwanted influence, which creates noise on the measurement, has a negative combined impact on the backscattered signal.

Figure 9:
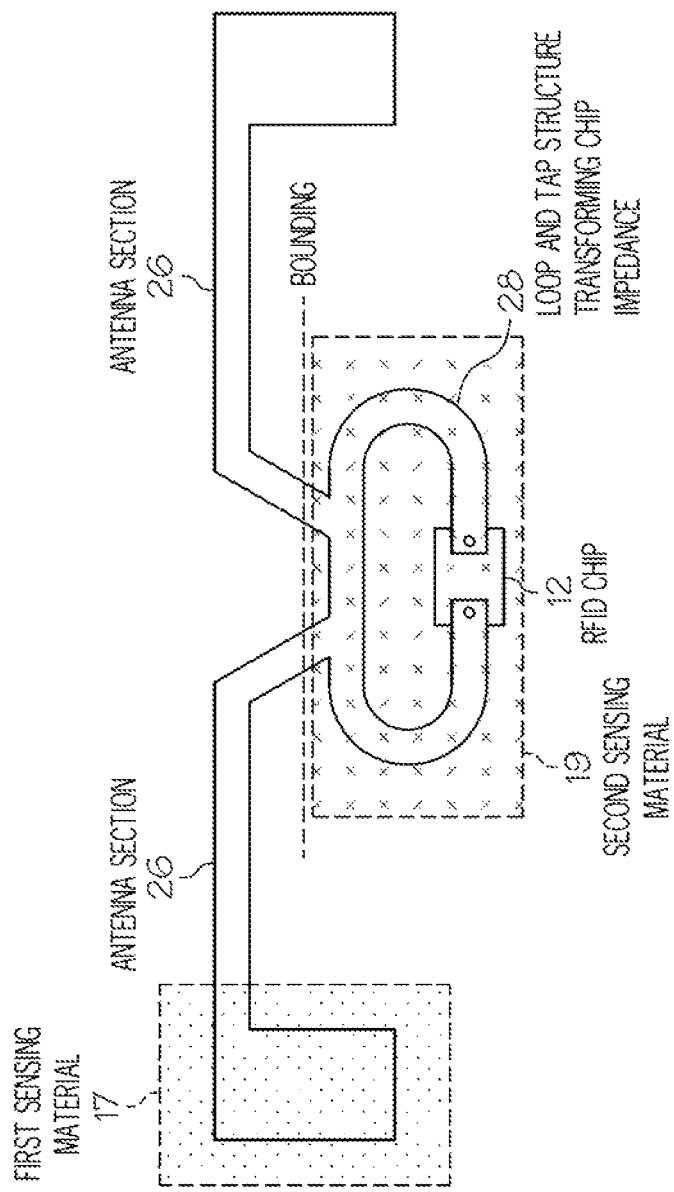
FIG. 9 illustrates use of two different sensing materials in alternate areas of the antenna and transformer in accordance with an exemplary embodiment.

FIG. 9 illustrates a structure where both the impedance transformer and antenna 26 are covered by different materials 17, 19. In one embodiment, the effect of the wanted environmental factor on both sections will create an additive effect on the backscattered signal, and the effect of an unwanted influence, which creates noise on the measurement, has a negative combined impact on the backscattered signal.

Figure 10:
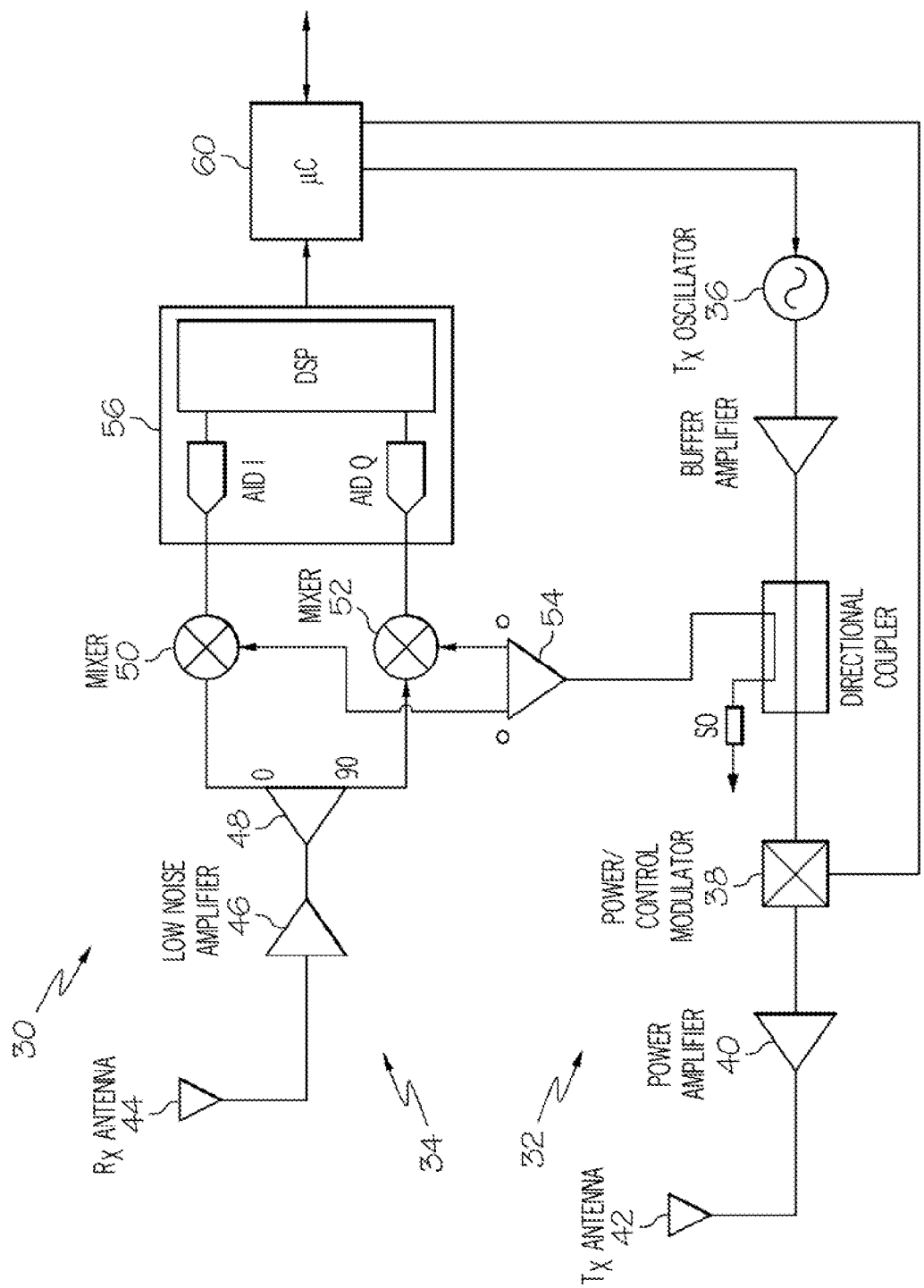
FIG. 10 illustrates a block diagram of an RFID reader system in accordance with an exemplary embodiment.

A reader system 30 for reading an RFID device with an antenna designed to convert an environmental factor into a change in complex backscatter is shown in FIG. 10. The reader system 30 includes two sections, i.e., a transmit section 32 and a receive section 34.

The transmit section 32 includes a frequency controlled oscillator 36 and amplitude modulator 38 driving a power amplifier 40 into a transmit antenna 42. The receive section 34 has a receive antenna 44 connected to a low noise amplifier 46, which then, via a 0 degrees 90 degrees power splitter 48 drives two mixers 50, 52. The mixers 50, 52 are driven by an equal phase local oscillator signal 54 derived from the transmit signal. This form of coherent demodulation recovers the in-phase (I) and quadrature (Q) versions of the backscattered signal from a tag 10 that is responding in range of the reader unit 30. The recovered I and Q signals are then fed to a digital signal processing block 56 and recovered data, such as the ID of the tag 10 and information on the amplitude and phase of the backscattered signal, is fed to the control microcontroller 60.

In operation, the reader system 30 performs initially in a similar way to a standard RFID reader. If a bidirectional protocol such as the Electronic Product Code (EPC) Class 1 Gen 2 UHF Air Interface Protocol standard is being used, the reader system 30 amplitude modulates its message with a QUERY command and waits for RN16 (16-bit random number) responses from tags. The reader 30 can then respond to a certain tag 10 with an acknowledgement (ACK) and carry out normal read and write functions by sending commands specific to the tag 10.

When attempting to determine the complex backscatter characteristics related to an environmental factor, usually multiple measurements will be taken to overcome noise and uncertainty. In an exemplary embodiment, a key point is to be able to set the chip impedance to known values by changing the transmit power. RFID chips 12 have a $Z_R$ and $Z_T$ that are partly dependent on the incident RF power. Therefore, by reducing the power level transmitted by the reader system 30 to the minimum threshold at which the tag 10 will read, $Z_R$ and $Z_T$ become known. Then, by increasing the power above the minimum threshold in steps, $Z_R$ and $Z_T$ are effectively set to a set of known values. In addition, by varying the frequency other measurements may be taken. This set of data points allows an accurate derivation of the antenna impedance and helps isolate noise effects, such as an unknown range between reader system 30 and RFID tag 10 being analyzed.

Figure 11:
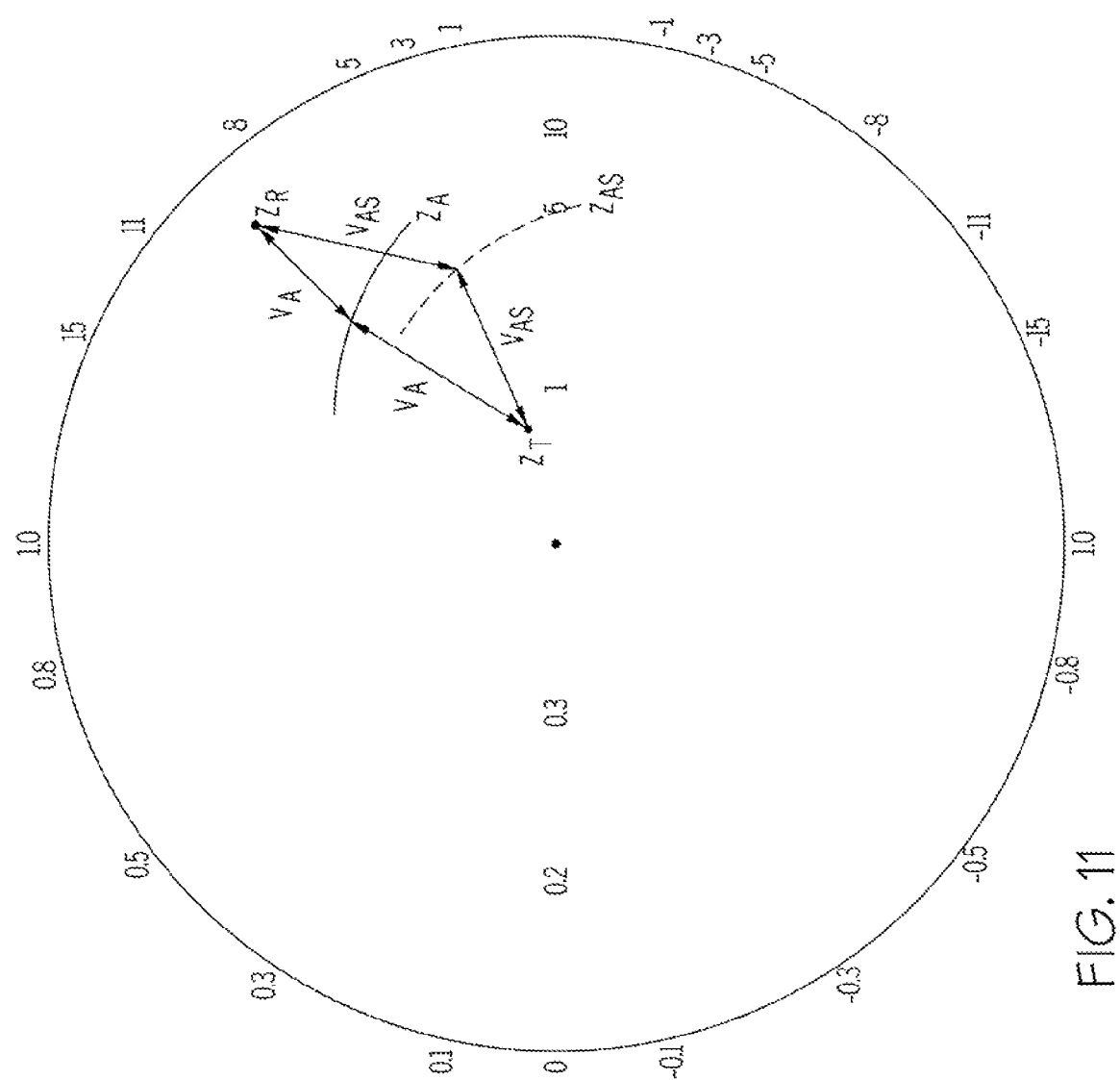
FIG. 11 illustrates a plot of antenna impedance versus frequency and complex conjugate of $Z_T$ and $Z_R$ in accordance with an exemplary embodiment.

FIG. 11 illustrates the process used to measure an environmental influence on the antenna. A common method of displaying complex impedances for radio engineers is to use the well-known Smith chart. By plotting the antenna impedance and the complex conjugate to the chip impedance in two states, the process of modulation can be visualized using the Smith chart. Other methods of visualization also can be used.

The antenna impedance, $Z_A$, is represented by a line as it varies substantially with frequency. The two chip impedances are displayed as their conjugates, to make visualization of the relative vectors easier (for example, the perfect match between $Z_R$ and $Z_A$ would occur in this representation when the two plots occupied the same point).

Considering the original condition of the antenna at a single frequency, there are two vectors representing the relative mismatch shown: $V_{A1}$ and $V_{A2}$. These vectors have a given length, representing relative reflection coefficient, and relative angle representing the phase. As the chip 12 switches between $Z_R$ and $Z_T$ to send a signal back to the reader system 30, the backscattered signal is a characteristic of $Z_R$, $Z_T$ and $Z_A$. By operating the tag 10 at minimum threshold, or a known amount above minimum threshold, $Z_R$ and $Z_T$ are known. When the antenna impedance $Z_A$ is altered by the environment to $Z_{AS}$, two new vectors, $V_{AS1}$ and $V_{AS2}$, are created, changing the modulation and therefore the backscatter. By altering frequency and power above minimum threshold, changing $Z_R$ and $Z_T$ in a known way, a series of measurements of the complex backscattered signal can be carried out allowing the value of $Z_{AS}$ to be determined.

Figure 12:
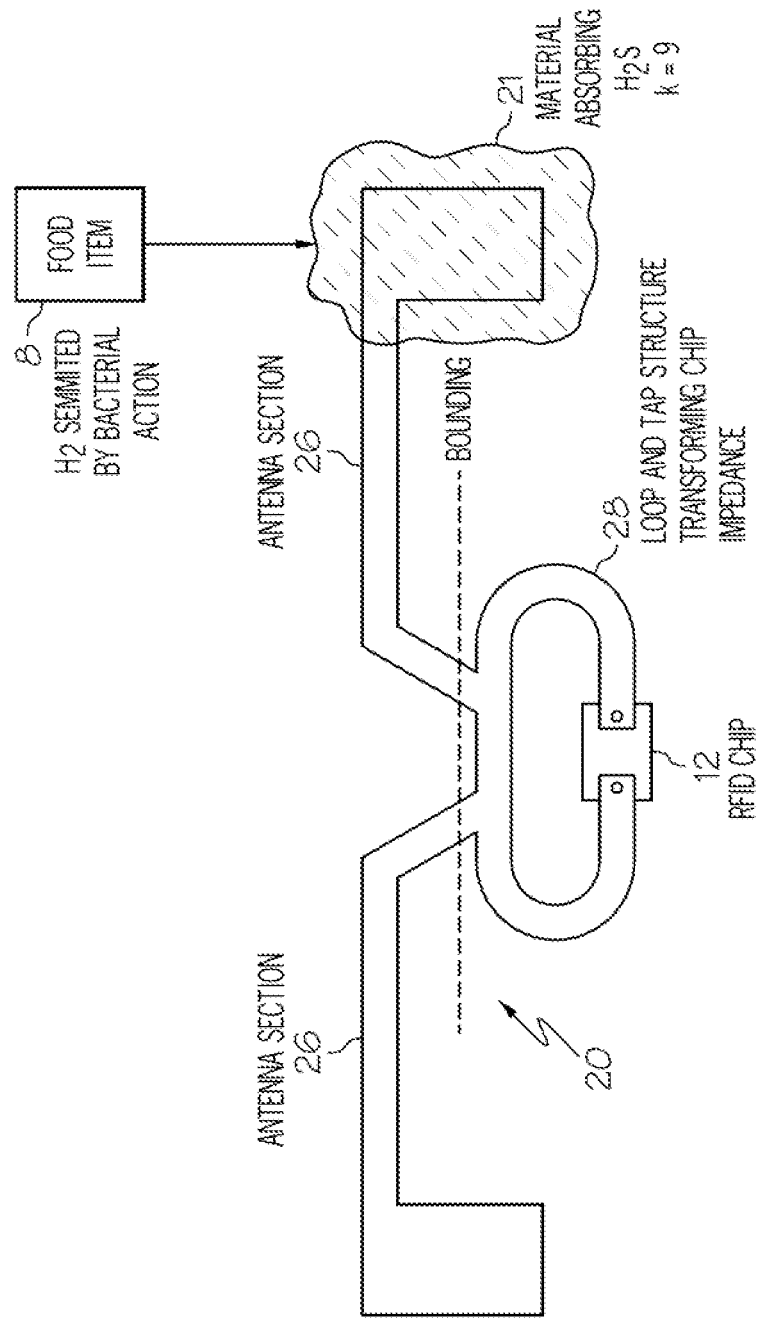
FIG. 12 illustrates an RFID tag sensitive to bacterial decay causing emission of $H_2S$ in accordance with an exemplary embodiment.

FIG. 12 illustrates an embodiment for measuring a gas emitted from a product 8 that is indicative of the presence a bacteria. The material 21 placed over the end of the antenna is a semi-permeable plastic or foam, and it will adsorb any hydrogen sulfide present. As $H_2S$ has a relative dielectric constant of 9, this will change the antenna impedance $Z_A$ to $Z_{AS}$, which is measured remotely by observing the change in backscattered signal.

Figure 13:
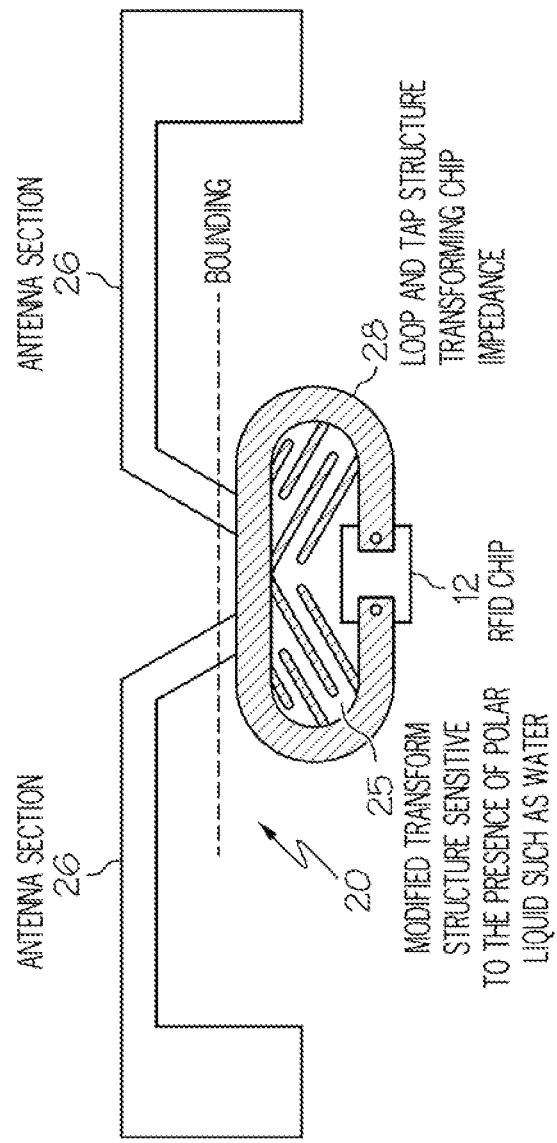
FIG. 13 illustrates a tag sensitive to polar liquid such as water in accordance with an exemplary embodiment.

Another embodiment is shown in FIG. 13. In this embodiment, an additional structure 25 has been added in the transformation section of the antenna. The inter-digital structure 25 reacts to change in dielectric constant caused by the area above becoming wet with a polar liquid such as water, and alters the transformation of $Z_R$ to $Z_{RT}$ and $Z_T$ to $Z_{TT}$, and therefore alters the backscattered signal phase and amplitude components.

Figure 14:
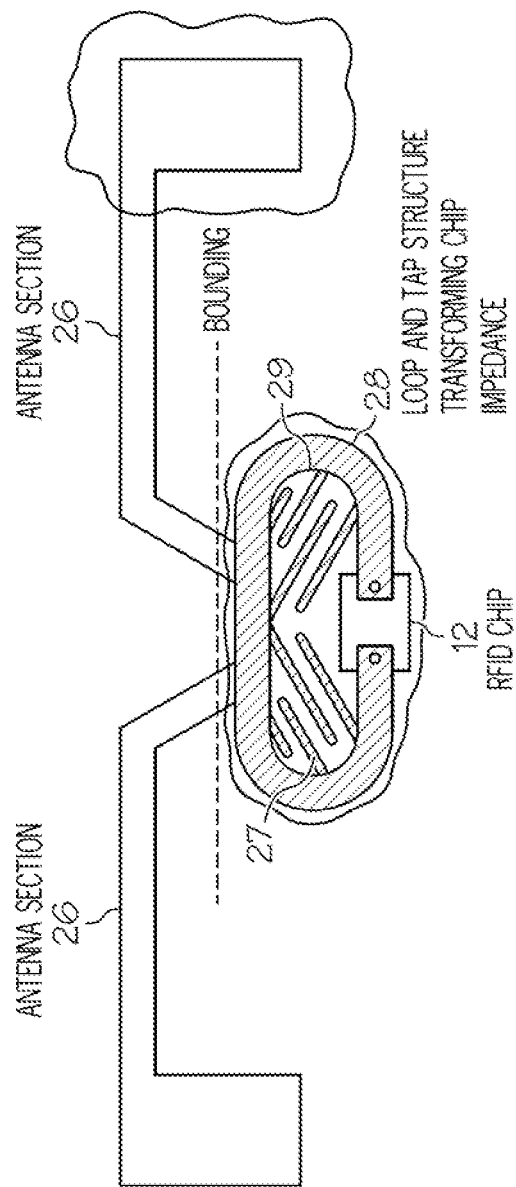
FIG. 14 illustrates a combined structure in accordance with an exemplary embodiment.

In FIG. 14 an embodiment with two different materials 27, 29 loading the sensing areas of the tag is shown. Both materials 27, 29 adsorb water vapor but the material loading the dipole end selectively adsorbs hydrogen sulfide. The two sensing areas are arranged so that, in the presence of water vapor, the effect on the modulated backscattered signal compared to the unexposed antenna is minimal, whereupon the effect of exposure to hydrogen sulfide is maximized.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiments are possible without departing from the scope of the present invention.

In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the present invention is defined solely by the appended claims.

What is claimed:

1. An RFID device comprising:
   a microchip;
   an antenna operatively coupled to the microchip, the antenna having a linear section and an impedance transforming section operatively coupled to the microchip and to the antenna with the impedance transforming section comprises a loop of conductor material having a pair of connection points for coupling to the microchip, the impedance transforming section transforming the microchip impedance to create a first complex reflected signal when the microchip is in a receive state;
   wherein changing an electrical characteristic of at least one component of the RFID device results in a second complex reflected signal at a reader device, creating a relative difference between the first complex reflected signal and the second complex reflected signal representing a sensed state of a material in proximity to the RFID device, and
   the changing of the electrical characteristic is controlled by varying an incident radio frequency power transmitted by the reader, and the reader measures amplitude and phase modulation of the reflected signal.

2. The RFID device of claim 1 wherein the device operates at an ultra high frequency.

3. The RFID device of claim 1 wherein the device operates in the 902-928 MHz band.

4. The RFID device of claim 1 wherein the material sensed comprises an analyte applied to the antenna and the changed electrical characteristic comprises an impedance of the antenna.

5. The RFID device of claim 1 wherein the material sensed is an analyte applied to the transforming section and the changed electrical characteristic comprises an impedance of the transforming section.

6. The RFID device of claim 1 wherein the material sensed is an analyte applied to both the antenna and the transforming section and the changed electrical characteristics comprises an impedance of the antenna and an impedance of the transforming section.

7. The RFID device of claim 1 wherein the complex reflected signal comprises a combination of an amplitude modulation and a phase modulation.

8. The RFID device of claim 1 wherein the transforming section comprises a loop of conductor material having a pair of connection points for coupling the microchip to the transforming section.

9. The RFID device of claim 1 wherein the transforming section comprises a loop of conductor material having a single connection point for coupling the microchip to the transforming section.

10. The RFID device of claim 1 wherein the transforming section comprises a loop of conductor material that is coupled to the microchip by an electromagnetic field.

11. The RFID device of claim 1 wherein the conductor material comprises any one of copper, aluminum, and silver.

12. The RFID device of claim 1 wherein the antenna comprises a dipole antenna.

13. The RFID device of claim 1 wherein the antenna and transforming section are combined as a single structure.

14. The RFID device of claim 1 wherein the sensed material has a complex dielectric constant that changes in response to an environmental factor.

15. The RFID device of claim 1 wherein the RFID device is attached to the material being sensed.

16. The RFID device of claim 1 wherein the material being sensed is applied to a specific region of the antenna.

17. The RFID device of claim 1 wherein the material being sensed is applied to both a specific region of the antenna and to the transforming section.

18. The RFID device of claim 1 wherein a first sensing material is applied to the antenna and a second sensing material is applied to the transforming section.

19. An RFID device comprising:
a microchip;
a combined structure operatively coupled to the microchip and including an antenna section and a conductor loop wherein the conductor loop functions as an impedance transforming section, the impedance transforming section is coupled to the microchip by an electromagnetic field, and wherein an environmentally sensitive material is added to the combined structure; and when the combined structure is interrogated by a RFID reader, the environmentally sensitive material causes a change in an electrical characteristic of the combined structure resulting in a complex reflected signal received at the reader representing a sensed state of the material;

wherein the change in electrical characteristic of the combined structure is control by varying the incident radio frequency power transmitted by the reader, and the reader measures the amplitude and phase modulation of the reflected signal.

20. The RFID device of claim 19 wherein the conductor loop comprises any one of copper, aluminum, and silver.

21. The RFID device of claim 19 wherein the antenna section comprises a dipole antenna.

22. The RFID device of claim 19 wherein the RFID device operates at an ultra high frequency between 902-928 MHz.

23. The RFID device of claim 19 wherein the environmentally sensitive material comprises an analyte.

24. The RFID device of claim 19 wherein the environmentally sensitive material comprises a concentration of an interferer.

25. The RFID device of claim 19 wherein the environmentally sensitive material is applied to the antenna section.

26. The RFID device of claim 19 wherein the environmentally sensitive material is applied to the conductor loop.

27. The RFID device of claim 19 wherein the environmentally sensitive material is applied to the conductor loop and to the antenna section.

28. The RFID device of claim 19 wherein the antenna section and the conductor loop are covered by different environmentally sensitive materials.

* * * * *